United States Patent [19]

Winslow

[11] Patent Number: 5,233,677
[45] Date of Patent: Aug. 3, 1993

[54] FIBER OPTIC PACKAGE

[75] Inventor: David T. Winslow, Mar Vista, Calif.

[73] Assignee: Hughes Aircraft Company, Los Angeles, Calif.

[21] Appl. No.: 842,821

[22] Filed: Feb. 27, 1992

[51] Int. Cl.$^5$ .............................................. G02B 6/42
[52] U.S. Cl. ........................................ 385/89; 385/80; 385/84
[58] Field of Search .................. 385/88, 89, 92, 78, 385/80, 84, 86

[56] References Cited

U.S. PATENT DOCUMENTS

| | | | |
|---|---|---|---|
| 3,871,744 | 3/1975 | Bridger | 385/86 X |
| 4,023,886 | 5/1977 | Nakayama et al. | 385/86 X |
| 4,373,778 | 2/1983 | Adham | 385/89 |
| 4,743,084 | 5/1988 | Manning | 385/80 X |
| 4,845,052 | 7/1989 | Abend | 385/89 |
| 4,863,232 | 9/1989 | Kwa | 385/89 |
| 5,048,915 | 9/1991 | Coutts et al. | 385/86 |
| 5,073,044 | 12/1991 | Egner et al. | 385/86 |
| 5,093,879 | 3/1992 | Bregman et al. | 385/93 |

*Primary Examiner*—Frank Gonzalez
*Attorney, Agent, or Firm*—L. A. Alkov; W. K. Denson-Low

[57] ABSTRACT

A fiber optic package in which a plurality of fiber optic cables are encapsulated in a layer of flexible material which in turn is bonded to the surface of a low mass, low profile, apertured stiffener member. A portion of the encapsulating material extends beyond the edge of the stiffener and is configured into a plurality of tongues that encapsulate individual ones of the fiber optic cables. The stiffener member is fastened to an apertured backplane. Fittings on the ends of the fiber optic cables extend through the clearance apertures in the stiffener member and the backplane to feed the fiber optic cable to the front face of the backplane for coupling to an associated optical component.

24 Claims, 3 Drawing Sheets

FIBER OPTIC PACKAGE

BACKGROUND OF THE INVENTION

1. Field of the Invention

This invention relates generally to fiber optics and more particularly to fiber optic packaging.

2. Description of the Related Art

In circuit packaging, applications size and weight are a serious constraint. For example, the circuitry might have limited space available for the installation and a limited weight allowance. Moreover, environmental conditions that the circuit packaging is subjected to, such as mechanical vibration, can create additional packaging constraints for the structure. This can be true for electro-optic circuits as well as other types of associated circuits.

Structurally, a typical fiber optics cable includes a central clad core of silicate optical fiber. For protection the core is surrounded by additional concentric layers of a buffer coating of silicone, a first jacket for protection, a strength member of woven fibers such as graphite, for example, and an outer jacket for protection. A typical total diameter of this cable might be about 1,650 microns, with a weight of 3.0 kilograms/kilometer.

In packaging fiber optic cables with backplanes such as a printed circuit mother board, for example, one termini of the fiber optic cable includes a connector fitting that can be inserted through a clearance aperture in the backplane and coupled to an associated fiber optic element such as an optical module on the front surface or circuit mounting side of the backplane. The fiber optic cable extends over and parallel to the back surface or harness access side of the backplane. The other termini of the cable includes a connector fitting that might be coupled to a fiber optic buss.

The fiber optic cable typically requires a 90 degree bend in the direction of its axis to run it parallel to the surface of the backplane. If the radius of the bend is too small, the fiber optic core can be stressed and fracture or exhibit degraded optical transmission capabilities. Thus the fiber optic cables have typically been suspended from a frame that is secured to the back surface of the backplane. These frames can have a profile that extends several inches above the surface of the backplane. The individual cables are secured to the frame by loop type fasteners.

Another approach is to loop the end of the fiber optic cable above the backplane without support and then return it to the backplane and secure the individual cables to the backplane with some type of strap.

Both of these approaches require excessive amounts of space for high density packaging applications, and limit access to the backplane. Moreover, mechanical vibration can affect the package structure. For example, the relatively high profile frame has a relatively high center of gravity that creates a moment arm that, with the mass of the frame, can set up forces that can distort the frame and undesirably affect the fiber optics. The loops in turn are unsupported and can vibrate uncontrollably.

In addition, the other end of the fiber optic cable extends beyond the edge of the backplane and frame and as a result is unsupported. Thus it can be subject to strain, especially at the edge of the supporting structure.

SUMMARY OF THE INVENTION

In meeting the challenges mentioned above, the present invention is embodied in an improved fiber optic package in which a fiber optic cable includes a core of clad optical fibers covered with a buffer coating. A first sleeve of flexible shrink plastic covers the buffer coating. The ends of the optical fibers terminate at rigid connector fittings, one of which can have a 90 degree bend. A shorter length of sleeve of the shrink plastic covers the first sleeve and the end of each of the connector fittings at the location where the fiber optics cable enters the fittings.

A backplane is apertured to receive the connector fitting. A low profile, low mass stiffener member, which is also apertured to receive the connector fittings, is secured to the backplane in a plane parallel to the plane of the backplane.

The fiber optic cables are encapsulated within a flexible material such as silicone rubber that also bonds to the surface of the stiffener member. This silicone is configured in a sheet and runs off of the edge of the stiffener with the fiber optic cables encapsulated inside it.

There are a number of advantages to such a fiber optic assembly and packaging. Among them are that higher density packing of the circuitry is possible than was practical with existing techniques. Moreover, the weight of the package is reduced. The lower weight and the low profile of the stiffener member also substantially reduces the effect of mechanical vibration on the structure. In addition, strain relief is provided for the fiber optic cables. Also, the structure is rugged and the stiffener and cables can be installed on or removed from the backplane in one piece. This provides easy access to the backplane to allow for repair and replacement of individual cables of the fiber optic cable assembly away from the backplane.

DESCRIPTION OF THE PREFERRED EMBODIMENT

Figure 1:
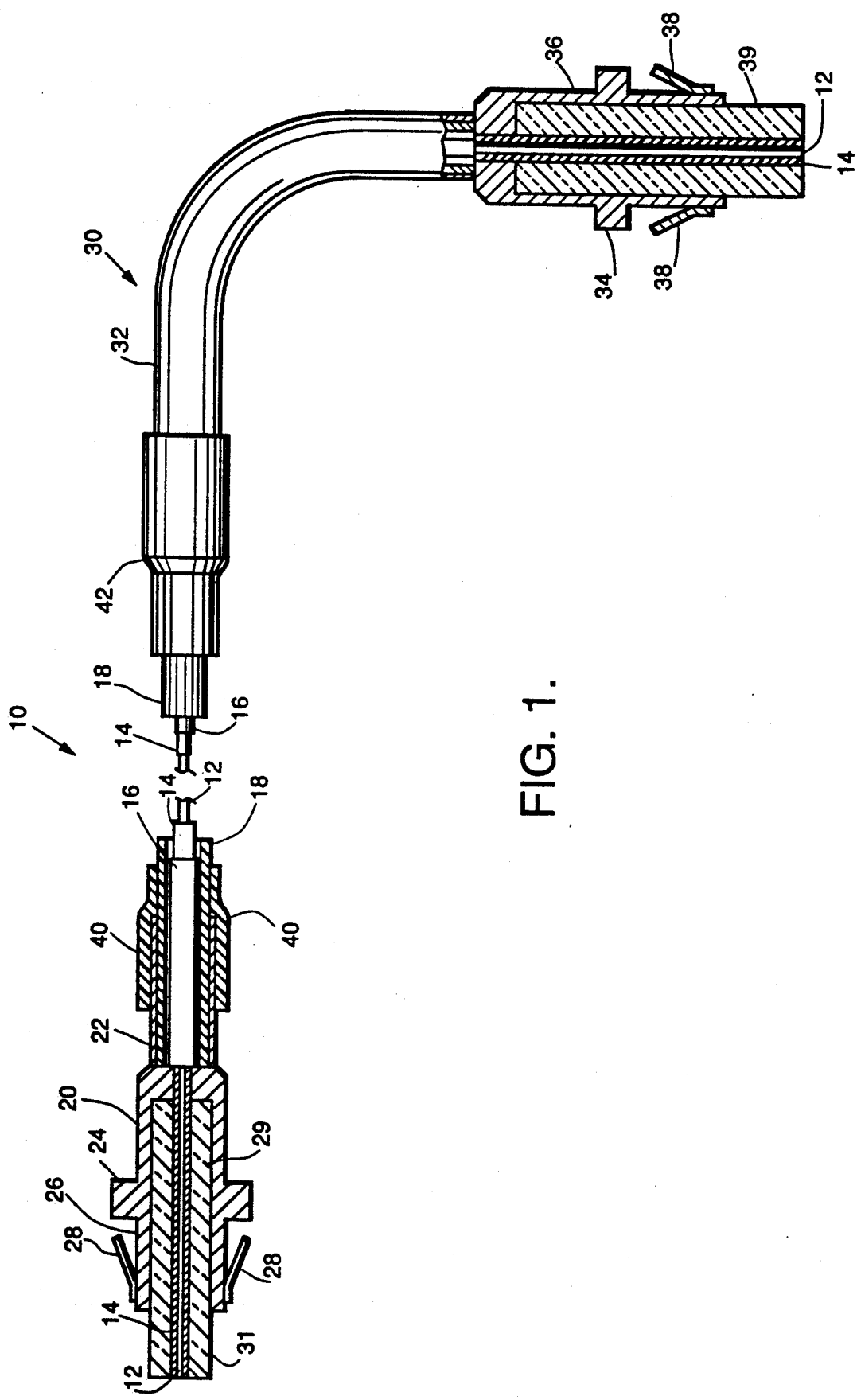
FIG. 1 is a side elevation view, partially n cross section, of a fiber optic cable having a straight connector fitting on one end and a 90 degree bend connector fitting on the other end.

Referring now to the drawings in more detail, a fiber optic cable 10 having a conventional fiber optic core 12 of SiO2 with an exemplary diameter of about 197.0 um is surrounded by a cladding layer 14 of SiO2 and GeO2 having an exemplary outside diameter of about 237 um. This cladding layer 14 is coated with a concentric buffer layer 16 of a flexible material such as, for example, an acrylate or a polyamide having an exemplary outside diameter of about 40 mils.

A sleeve 18 of plastic or shrink plastic including, for example, polytetrafluoroethylene, polyvinylidene fluoride or fluorinated ethylene propylene corresponding to Military Specification M-23053/8 surrounds the buffer layer such that the fit allows the buffer layer 16 to float within the hollow core of the sleeve 18. A clearance of about 20 mils should be sufficient for this purpose. The sleeve 18 can have an outside diameter of about 35 mils. As a result of this smaller diameter the cables 10 can be more densely packaged than could be the more heavily protected existing fiber optic cables. Moreover, the buffer coated fiber optic core can move within the sleeve 18 to compensate for different factors such as differentials in thermal expansions.

One end of the fiber optic cable 10, including the sleeve 18, is inserted into one end of a fitting 20 having a tubular straight body 22. This fitting is fabricated from a strong rigid material such as stainless steel, for example. The other end of the tubular body is welded to a cylindrical terminus pin 26 having a boss 24 disposed around the outer surface of it. This terminus pin 26 has a small diameter aperture extending along its axis which receives the clad fiber optic core 12 and 14. The small diameter aperture is connected to a larger diameter cylindrical chamber 29 within the terminus pin 26.

This chamber 29 receives a cylindrical ceramic ferrule 31 that is apertured along its axis to snugly receive the clad fiber optic core 12 and 14. The end of this clad fiber optic core extends to the end of the ceramic ferrule 31. The fiber optic core 12 and 14 is bonded to the ferrule 31 with an epoxy type adhesive.

Disposed on the outside wall of the terminus pin 26 are two retaining clips 28. These clips 28 comprise spring members that are secured at one end to the wall of the terminus pin 26 such that the free ends of the spring members are displaced above the wall of the terminus pin.

Similarly, the other end of the cable 10 is inserted into a hollow fitting 30 having a body 32 that is bent so that its axis is curved at a 90 degree angle, or right angle. The radius of this curve is sufficiently small to permit the cables 10 to be directed parallel to and close to the back surface of the backplane 52 without unduly straining the clad core 12 and 14. One radius that has been effective in one embodiment is 0.350 inch. This radius is, of course, dependent in part upon the thicknesses of the packaging components used and the amount of bend that the fiber optic core can withstand without degrading its optical transmission capabilities or its mechanical integrity. A boss 34 surrounds a terminus pin 36. This terminus pin 36 is also apertured to receive a cylindrical ceramic ferrule 39 and the clad fiber optic core 12 and 14 in the same way that the fitting 20 does. Also disposed at the terminus pin 36 are two retaining clips 38.

Two short lengths of a second layer of shrink sleeve 40 and 42 are installed over the first sleeve 18 and the tubular bodies 22 and 32 of the fittings 20 and 30 for additional strain relief of the cable 10 at the regions that it enters the fittings 20 and 30. This shrink sleeve 40 and 42 grips the first sleeve 18 and the fittings 20 and 30 tightly and secures the structure.

Figure 2:
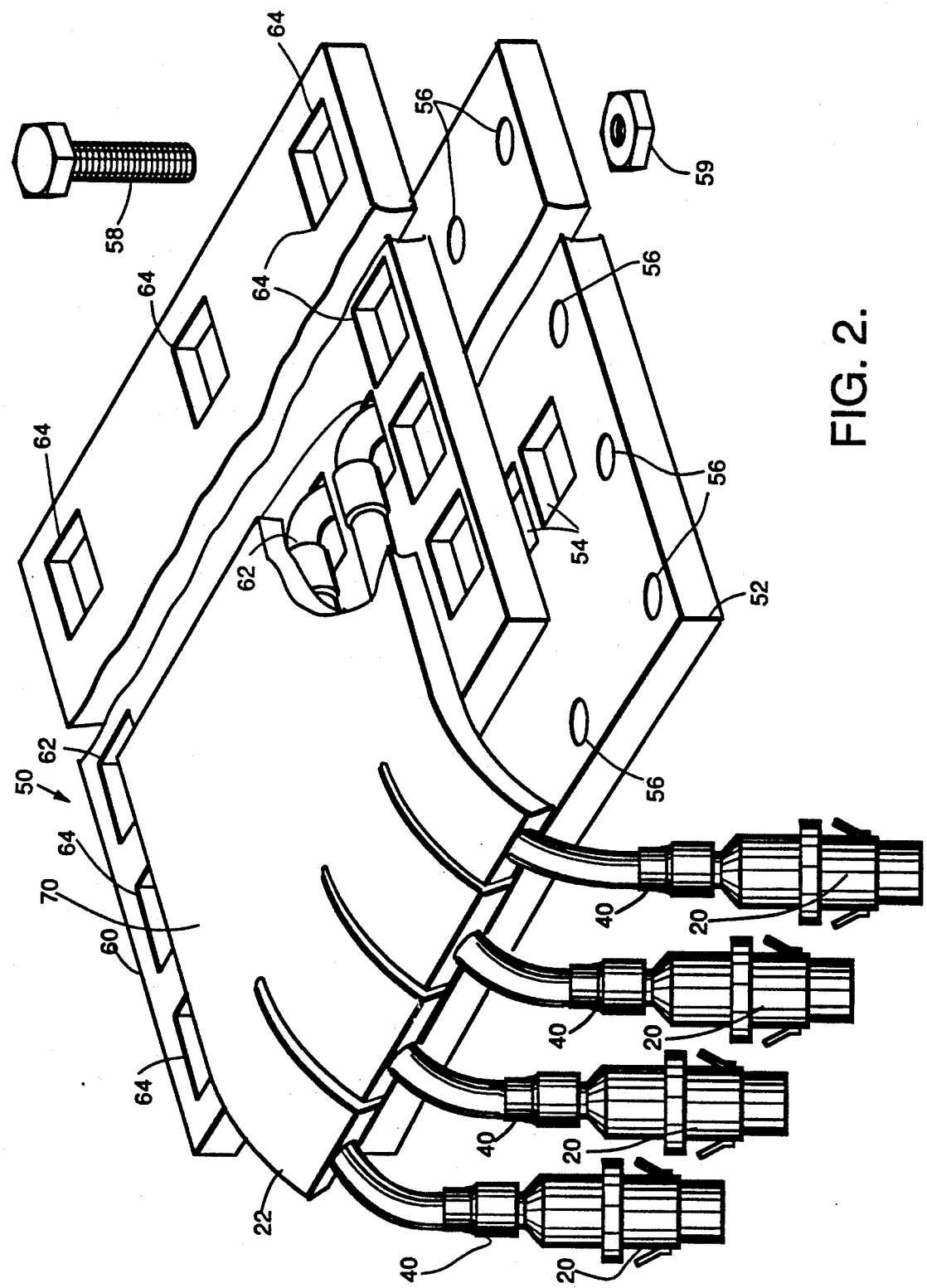
FIG. 2 is an isometric view of a fiber optic package assembly in which a plurality of fiber optic cables are encapsulated on a stiffener member that is superposed over a backplane.

A fiber optic package assembly 50 illustrated in FIG. 2 includes a plurality of fiber optic cables 10 which are to be connected to a backplane 52 such as a mother board, a printed wiring board, printed circuit board, etc. This backplane 52, for example, can be fabricated from epoxy or any other conventional material.

Disposed in a region of the backplane 52 away from the peripheral edges are a plurality of rectangular clearance apertures 54 that extend through the backplane 52. These apertures are generally rectangular and are large enough to operably receive one or more of the 90 degree fittings 30 of the fiber optic cables 10 to allow them to extend to the front face or circuit mounting surface of backplane 52.

A plurality of mounting apertures 56 are also formed around the periphery of the backplane 52. These mounting apertures 56 are sized and positioned to operably receive fasteners such as mounting bolts 58.

A stiffener member 60 illustrated as superposed over the backplane 52 operably holds the plurality of fiber optic cables 10. This stiffener member 60 includes a plurality of rectangular clearance apertures 62 which operably receive the fittings 30 of the cables 10 to allow them to pass through the stiffener member 60 to the backplane 52. These clearance apertures are dimensioned similarly to the clearance apertures 54 of the backplane 52 and are individually in registration with individual ones of these other clearance apertures 54.

A plurality of mounting apertures 64 are disposed around the periphery of the stiffener member 60 and are in registration with the mounting apertures 54 of the backplane 52. While these apertures are illustrated as being rectangular, they could have other configurations. Mounting bolts 58 are operably inserted through these apertures 64 and mounting apertures 56 and threaded either into the threaded mounting apertures 56 or onto a nut 59 to secure the stiffener member 60 to the backplane 52 or into some other superstructure.

This stiffener member 60 is illustrated as planar and rectangular, is lightweight and has a low profile. For example, the stiffener can be fabricated from a thin sheet of fiberglass epoxy material or even a thicker layer of a honeycomb structure of a lightweight fiberglass epoxy. The thickness of a sheet of stiffener that has been used is 0.10 inch, and honeycomb stiffener members that have been used is about 0.35 inch. This stiffener member 60 provides rigidity and support for the fiber optic cables 10 that are mounted on it.

The plurality of fiber optic cables 10 are mounted on the surface of the stiffener member 60 that faces away from the backplane 52. These cables 10 are mounted onto the stiffener 60 by encapsulating the cables in a layer of flexible material 70 that bonds to the surface of the stiffener member 60. This encapsulation layer 70 thus protects the cables 10 and secures them to the stiffener. A material that is preferred and is effective is silicone rubber that meets Military Specification ZZ-R-765, class 3B, grade 30.

The layer of encapsulating material 70 extends beyond the periphery of the stiffener 60 as flexible tongues 72 that encapsulate the cables 10 and protect them from being bent at too small a radius as they exit the supporting surface of the stiffener 60. Too sharp a bend at the edges of the support structure might stress the fiber optic core 12 and cladding 14, causing it to fracture or to degrade its light transmission properties. Moreover, this tongue 72 allows the cables 10 to be directed off of the stiffener at various angles without stressing the fiber optic core 12.

As illustrated at the broken away portion of the encapsulating material 70, the fittings 30 are positioned over the clearance apertures 62 and bend to extend through the apertures toward the clearance apertures 54 of the backplane 52.

Figure 3:
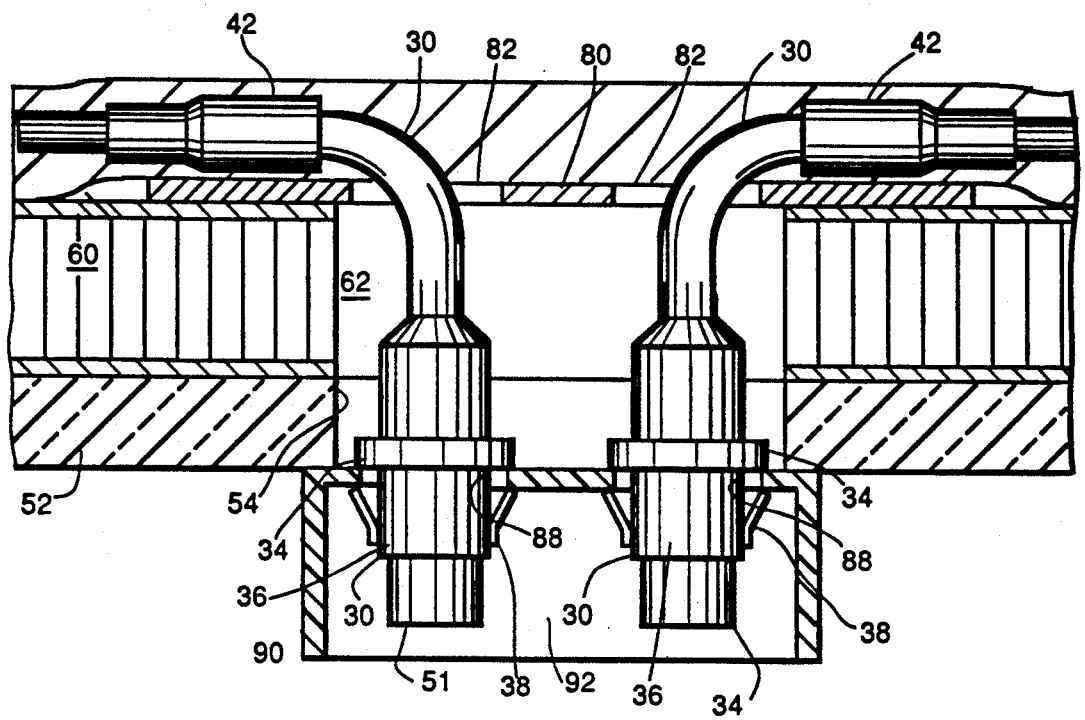
FIG. 3 is an enlarged side elevation view, partially in cross section, of a portion of the fiber optic package assembly showing the relationship between two of the encapsulated fiber optic cables, the stiffener member, the backplane and a module coupler on the front face of the backplane.

More specifically, as illustrated in cross section in FIG. 3, when the stiffener member 60 is fastened onto the backplane 52 the termini fittings 30 of two fiber optic cables 10 coming from opposite directions extend through the clearance apertures 54 and 62 to the mounting face of the backplane 52.

A thin sheet 80 of a rigid material is positioned over the clearance apertures 62 such that its periphery overlaps and rests on the surface of the stiffener member 60. One material that has been effectively used is polytetrafluoroethylene about 0.070 inches thick. This sheet 80 also has clearance apertures 82 having a diameter slightly larger than that of the fittings 30 to receive the fittings 30 and allow them to pass through the stiffener member 60 and the backplane 52. However, in certain embodiments this sheet 80 can be eliminated.

As a result of the location of the sheet 80, the silicone encapsulation layer 70 does not bond to the surface of stiffener member 60 in the region immediately adjacent to the clearance apertures 62. As a result, there is a slight amount of deflection and give which takes up some of the stress on the fittings 30 and allows the fitting to be more easily removed from the backplane 52 for replacement and repair of the fiber optic cables 10.

The terminus pins 36 of the fittings 30 extend through an aperture 88 in an end wall of a housing 90 of a module connector into a chamber 92. This housing 90 is secured to the circuit mounting face of the backplane 52. When the fitting 30 is fully inserted into the chamber so that the shoulder of the boss 34 abuts the bottom wall of the housing 90, the free ends of the retaining clips 38 spring outward to secure the fittings 30 in position and prevent them from being withdrawn.

A mating housing (not shown) of the module connector can then be inserted into the chamber 92 of the housing 90 to connect the fiber optic cables 10 to a corresponding input fiber optic cable associated with optical circuit elements. Of course, other types of connections can be used instead of the module connector.

Figure 4:
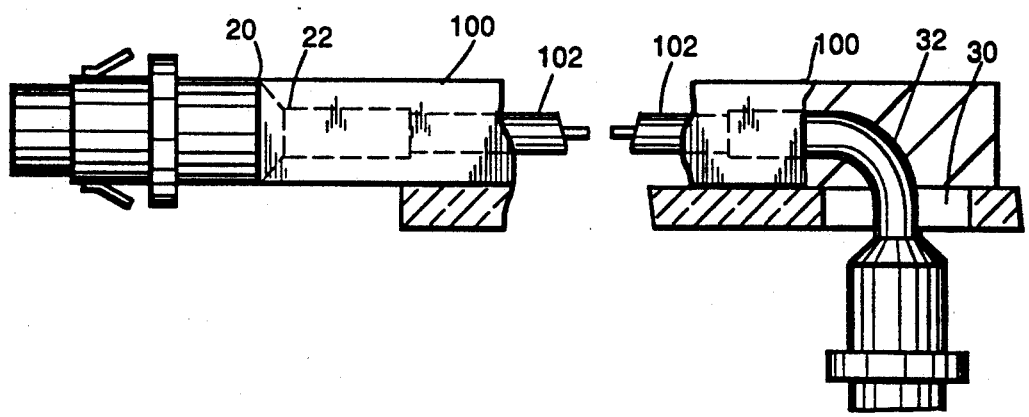
FIG. 4 is a side elevation view of another embodiment of the fiber optic package assembly in which the termini fittings are partially encapsulated.

In another embodiment illustrated in FIG. 4, the termini fittings 20 and 30 are partially encapsulated in an encapsulating layer 100. Specifically, the encapsulating layer 100 extends partly along the hollow body 22 of fitting 20 and partially along the hollow body 32 of the fitting 30. The encapsulating material thus is able to secure the fitting 20 and 30 to the hollow sleeve 102. This hollow sleeve 102 can be fabricated from the same materials that the hollow sleeve 18 is or from polytetrafluoroethylene.

While salient features have been described with regard to particular embodiments, other applications, variations and modifications can be made without departing from the scope of the invention. Accordingly, that scope is intended to be limited only by the scope of the appended claims.

I claim:

1. A fiber optic package comprising:
   at least one fiber optic cable having a connector fitting on an end thereof;
   a first member consisting of a terminus pin with a boss to provide structural stiffness, said member having aperture means extending therethrough;
   a flexible material encapsulating said at least one fiber optic cable, said flexible material being bonded to a surface of said first member;
   a second member for supporting circuit components, said second member having aperture means in registration with said aperture means of first member, said aperture means of said second member being operable to receive said connector fitting to allow said fiber optic cable to pass through said second member; and
   means for operably securing said first member and said second member together.

2. The fiber optic cable of claim 1 in which said flexible material extends off the edge of said first member.

3. The fiber optic package of claim 1 in which said flexible material is a silicone rubber mixture.

4. The fiber optic package of claim 1 in which said first member is planar and is secured to said second member with its plane parallel to the plane of the adjacent surface of said second member.

5. The optical fiber package of claim 4 in which said first member has a stiffness, and a center of gravity and a mass to protect said first member from mechanical vibration.

6. The fiber optic package of claim 1 in which said at least one fiber optic cable includes a plurality of fiber optic cables, said fiber optic cables being disposed in said flexible material adjacent to the surface of said first member.

7. The fiber optic cable package of claim 1 which said fiber optic cable includes a fiber optic core, a coating of buffer material surrounding said core, and a first sleeve of flexible material surrounding said coating of buffer material, the inside dimensions of said sleeve being sufficiently large to permit axial movement of said core within said sleeve.

8. The fiber optic package of claim 7 in which said first sleeve is comprised of a shrink plastic.

9. The fiber optic package of claim 7 in which said fiber optic cable includes a second sleeve of flexible material snugly surrounding said first sleeve and said fitting in the region that said first sleeve meets said fitting.

10. The fiber optic package of claim 9 in which said second sleeve is a shrink plastic.

11. The fiber optic package of claim 4 in which said connector fitting is bent at an angle to bend the axis of the fiber optic cable toward said second member.

12. The fiber optic package of claim 11 in which said connector fitting is bent at a right angle.

13. The fiber optic package of claim 1 in which said first member comprises a honeycomb core sandwich.

14. The fiber optic package of claim 7 in which said first sleeve is comprised of polytetrafluoroethylene.

15. The fiber optic package of claim 2 in which said at least one fiber optic cable includes a plurality of fiber optic cables and said flexible material that extends off the edge of said first member is divided into a plurality of tongues that encapsulate individual ones of said plurality of fiber optic cables.

16. The fiber optic package of claim 15 in which said first member is generally planar and said aperture means includes a plurality of mounting apertures disposed around the periphery of said first member and a plurality of apertures for receiving said connector fittings disposed toward the central portion of said first member; and said second member is generally planar and said aperture means of said second member includes a plurality of mounting apertures disposed in registration with the mounting apertures of said first means and a plurality of apertures for receiving said connector fittings disposed in registration with the plurality of apertures for receiving said connectors of said first member.

17. A fiber optic package comprising:
  at least one fiber optic cable in which said at least one fiber optic cable includes a plurality of fiber optic cables and said second portion of said flexible material is divided into a plurality of tongues that encapsulate individual ones of said plurality of fiber optic cables;
  a first member consisting of a terminus pin with a boss for providing structural stiffness, said first member having aperture means extending therethrough; and
  a flexible material encapsulating said at least one fiber optic cable, a first portion of said flexible material being bonded to a surface of said first member and a second portion of said flexible material extending beyond the edge of said first member.

18. The fiber optic package of claim 17 in which said first member is a low mass material having a low profile.

19. The fiber optic package of claim 18 in which said first member has a thickness of less than about 0.5 inch.

20. The fiber optic package of claim 18 in which said first member has a thickness of less than about 0.10 inch.

21. The fiber optic package of claim 17 in which said at least one fiber optic cable includes a fiber optic core and a flexible sleeve surrounding said core and spaced to allow said core to float within said sleeve.

22. The fiber optic package of claim 21 in which said sleeve is a shrink plastic.

23. The fiber optic package of claim 21 in which said fiber optic cable further includes a termini fitting having a hollow portion and the end of said sleeve is disposed within said hollow portion.

24. The fiber optic package of claim 23 in which said fiber optic cable further includes a second layer of sleeve surrounding said hollow portion of said fitting and the end of said sleeve disposed adjacent to said termini fitting, said second layer of sleeve being a shrink plastic.

* * * * *